United States Patent [19]

Hsu

[11] Patent Number: 4,816,665

[45] Date of Patent: Mar. 28, 1989

[54] SENSOR ARRAY FOR FOCUS DETECTION

[75] Inventor: Sunny K. Hsu, Sunnyvale, Calif.

[73] Assignee: Maxtor Corporation, San Jose, Calif.

[21] Appl. No.: 82,806

[22] Filed: Aug. 6, 1987

[51] Int. Cl.[4] ............................................... G01J 1/20
[52] U.S. Cl. ....................................... 250/201; 369/45
[58] Field of Search ................ 250/201 DF, 204, 208, 250/209; 369/45, 46, 44

[56] References Cited

U.S. PATENT DOCUMENTS

| | | | |
|---|---|---|---|
| 4,458,144 | 7/1984 | Reilly et al. | 369/46 X |
| 4,654,838 | 3/1987 | Sugiki | 369/46 |
| 4,695,158 | 9/1987 | Kotaka et al. | 250/201 DF X |

FOREIGN PATENT DOCUMENTS

| | | | |
|---|---|---|---|
| 0007245 | 1/1981 | Japan | 369/45 |
| 0047931 | 4/1981 | Japan | 369/45 |
| 0066336 | 4/1985 | Japan | 369/45 |
| 01700037 | 9/1985 | Japan | 369/46 |

Primary Examiner—David C. Nelms
Attorney, Agent, or Firm—Hecker & Harriman

[57] ABSTRACT

Method and apparatus for astigmatic focusing control which is independent of intensity distribution and is implemented with a combined data/focus error sensor array is described. An objective lens is utilized to focus a laser beam for use in reading and/or writing in an optical disk storage system. An astigmatic focus control system is utilized in which a cylindrical lens is disposed in the path of light reflected from the optical disk. The light from the cylindrical lens forms an astigmatic image on a sensor array. The image shifts between a circle at the focal point and one of two ellipses disposed orthoganally to each other depending on whether the focal point of the objective lens is above or below the plane of the optical disk. In the preferred embodiment, a circular bi-cell sensor is disposed so as to receive and encompass a reflected beam through the cylindrical lens when the objective lens is "in focus". An outer array of four sensors is disposed symetrically about the central bi-cell. The sensor is such that no light is disposed on the outer four sensors except when the object lens is out of focus. By utilizing only the four outer sensors, false focus error signals are avoided, since there is only one true "zero" condition, namely when the objective lens is properly focused. Data information may be derived from the sum of the two inner elements (bi-cell) when the system is properly focused. In an alternate embodiment, a single sensor is utilized in the central region in lieu of a bi-cell.

33 Claims, 3 Drawing Sheets

SENSOR ARRAY FOR FOCUS DETECTION

BACKGROUND OF THE INVENTION

1. Field of the Invention

This invention relates to the field of apparatus for controlling the focus of a light beam in an optical data storage system.

2. Background Art

Optical disk recording and reproducing systems store information, such as video, voice, digital and other data, on a disk in a series of concentric or spiral "tracks". The disk is rotated at high speed and a light, such as a laser or any other suitable, detectable radiation source, is utilized to scan the disk. The light is reflected from the data tracks and modulated by the data information stored in the tracks. This modulated and reflected light is detected and decoded to reproduce the information stored on the disk.

Recently, optical disks have become a viable means for storage of electronic information and for use in memory systems for computer related activities. Two forms of such optical memories are known as optical ROM's (read only memories) or WORM's (write once, read many times). In addition, development is under way of optical disks that have the functional capability of magnetic hard disk or floppy disk storage systems; namely, the information on these new optical disks may be erased, written and/or read many times.

Typically, the cost per unit capacity is critical in order to keep the cost of optical disk storage systems low. It is desired to store information at high area density on the optical disk. In optical disk systems, information density is dependant on the area of the focused light spot incident on the disk, which light is utilized in reading information from the disk. To achieve a small area focused spot in high density optical disk systems, an objective lens system with a large numerical aperture is used, having an associated depth of focus that is small, often on the order of microns.

In modern optical disk media, invariably there is displacement of the disk surface at any given point on the disk during rotation in both the axial and radial directions resulting from disk processing variations and disk mounting error. As a result the focus spot position of the light beam must be repeatedly corrected using a focus servo system in the axial direction and a tracking servo system in the radial direction.

Although the light reflected from the disk to be irradiated is utilized for the focal point detection light beam, the transmitted light may be utilized for the same purpose from a similar technical point of view.

Astigmatic Focus

One prior art method for detecting errors in the focusing of a light beam on an information plane (disk surface) is an astigmatic focusing error detection system. A cylindrical lens is introduced into the objective lens system to make the reflected light beam astigmatic. This astigmatic beam is projected onto a sensor array which in the prior art consists of four radiation sensitive detectors disposed in a two by two array. The astigmatic beam projects a spot on the detector array which changes shape depending on the relative focus of the light beam of the objective system. This change in shape of the astigmatic spot is detected by combining the output signals of the four detectors.

One such prior art system is described in Bouwhuis, U.S. Pat. No. 4,123,652. As described therein, a beam reflected from the disk is made astigmatic and presents a circular cross section to the sensor array when the focused spot is in focus relative to the disk surface. When the focal point of the light beam occurs above the place of the disk surface, the reflected beam forms a first ellipse on the surface of the sensor array. When the focal point occurs below the plane of the disk surface, the reflected beam forms a second ellipse situated at right angles to the first ellipse. By disposing an array of four sensors symmetrically disposed about the center of the "in focus" circular astigmatic beam, the position of the focused spot relative to disk surface may be determined by combining the output of the sensor array. For example, when the focused spot is not on the disk surface (in either direction) two sensors of the array will receive more reflected light than the two other remaining sensors. This difference can be detected and an error signal generated to control a servo system to drive the objective lens so that the focused spot stays on the disk surface.

There are disadvantages with the system of Bouwhuis described above. This prior art method requires that the light incident on the sensor array have a uniform intensity distribution so that when in focus, each element of the sensor array receives an equal amount of incident light. However, as the focused light spot is scanned across tracks of data on an optical disk, optical diffraction occurs. The light reflected from the disk has different orders of diffraction located at different positions within the reflected beam. The different orders of diffracted light interfere depending on the relative position of the focused spot to the disk's micro-structure. In addition, abberations in the optical system may introduce interference fringes among the different orders of diffraction which may appear and move in an unpredictable manner. As a result, the intensity distribution of the reflected beam is not spatially uniform and symmetrical. This nonuniformity and nonsymmetry generate a plurality of "zero crossings", where the amount of light on each of the sensors of the sensor array is equal (ideally indicating an "in focus" condition). Thus, a corrective servo system may drive the objective lens to a nonfocus position based on erroneous "zero crossings" from the sensor array.

One prior art attempt to avoid this problem is illustrated in Nakamuro et al, U.S. Pat. No. 4,450,547. In Nakamura, focal point images are formed at two foci spaced apart from each other by a cylindrical lens disposed in the path of a light beam reflected from the disk surface. A knife edge is inserted at a site between the two foci, partially blocking the beam. As the focal point is moved inward or outward from the optical disk, the part of the beam not blocked is rotated in an optical field behind the knife edge. A bi-cell (two sensor array) receives the beam and is used to create a bipolar focus error signal. One disadvantage of this system is that the bi-cell sensor must be placed in a far field region, and a relatively large area bi-cell is required. Since, in general, the speed (or, equivalently, the bandwidth) of a photosensor is inversely proportional to the active area of the sensor, the requirement of a large area bi-cell makes it difficult to achieve sufficient bandwidth to use the sensor as a data detector in addition to a focus error detecting device.

Another disadvantage of this prior art system is that a knife edge or an optical equivalent, (e.g. a wedge prism) is introduced into the optical system. Such a knife edge adds to the complexity of the optical system by increasing the number of elements and further must be constantly adjusted and mechanically stabilized.

Therefore, it is an object of the present invention to provide a focus error detection control system which is intensity distribution independent and may be used in an optical disk system.

It is a further object of the present invention to provide a focus error control system in which a single sensor array may be utilized for both focus error control and high bandwidth data detection.

It is yet another object of the present invention to provide a focus error detection system in which a focus error signal may be generated with fewer optical elements.

SUMMARY OF THE PRESENT INVENTION

Method and apparatus for astigmatic focusing control which is independent of intensity distribution variation due to abberations and interference and which is implemented with a combined data/focus error sensor array is described. An objective lens is utilized to focus a laser beam for use in reading, writing and/or erasing, in an optical disk storage system. An astigmatic focus control system is used in which a cylindrical lens is disposed in the path of light reflected from the optical disk. The light transmitted through the cylindrical lens forms an image on a sensor array. The shape of the image on the sensor array shifts between a circle at the focal point and one of two ellipses disposed orthoganally to each other depending on whether the optical disk is too close or too far away from the objective lens.

In the preferred embodiment, a circular bi-cell sensor is disposed so as to receive and encompass a reflected beam through the cylindrical lens when the objective lens is "in focus". An outer array of four sensors is disposed symmetrically about the central bi-cell. The sensor is such that light incident on the outer four sensors is at a minimum when the object lens is in focus. By utilizing only the four outer sensors, false focus error signals are avoided, since there is only one true "zero" condition, namely when the objective lens is properly focused. The sum of the light incident on the central circular bi-cell in maximum when the objective lens is "in focus". This summed signal can be conveniently used as the focus enable signal.

Optical disks are manufactured with a certain formats depending on the intended use. Depending upon the format adapted, the difference in light level received by the central circular bi-cell, may be used as the error signal for the tracking servo system. The sum and difference light level signals received by the two central circular bi-cell sensors can be used as "quadrature signals" for track counting during disk accessing. Data information may be derived from the sum of the light incident on the two inner elements (bi-cell) when the system is properly focused and tracked. In an alternate embodiment, a single sensor is utilized in the central region in lieu of a bi-cell.

DETAILED DESCRIPTION OF THE PRESENT INVENTION

Method and apparatus for controlling the focus of an optical disk storage system read and/or write and/or erase beam is described. In the following description, numerous specific details, such as wavelength, focal length, etc. are set forth in order to provide a more thorough description of the present invention. It will be obvious, however, to one skilled in the art, that the present invention may be practiced without these specific details. In other instances, well known features have not been described in detail in order not to unnecessarily obscure the present invention.

Figure 1:
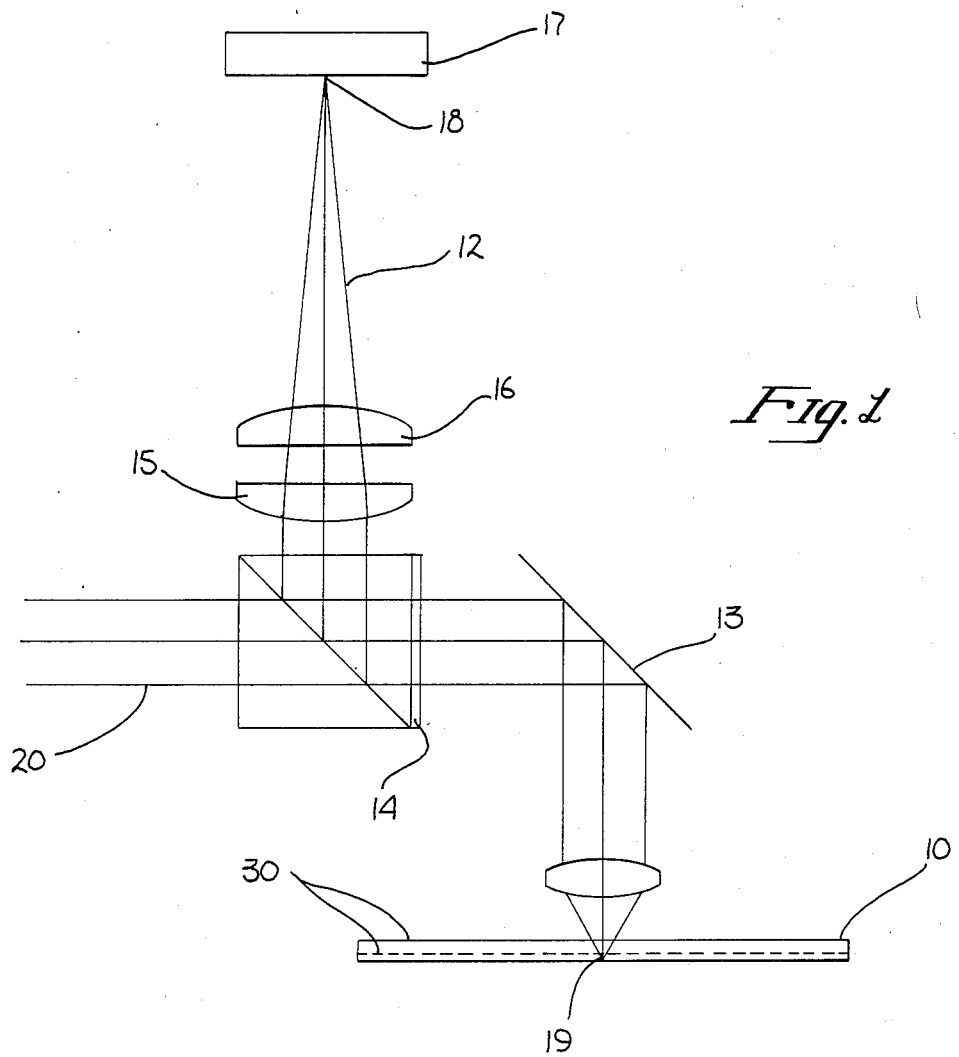
FIG. 1 is a side view of the focal point detection system of an optical disk storage system.

An example of an optical system such as may be used with the present invention is illustrated in FIG. 1. An optical disk 10 is shown in cross section and includes a plurality of data tracks defined by ridges 30. The optical disk 10 is representational only and is not drawn to scale. Likewise the various elements of the optical system of FIG. 1 are representational and not drawn to scale. A light beam 20, which may be a laser, is transmitted through a beam splitter 14 to routing mirror 13 and is focused on the optical disk 10 by objective lens 11.

The objective lens is coupled to an electromechanical servo system (not shown) which adjusts the position of the objective lens 11 relative to the optical disk 10 so that light 20 may be converged to a focused spot 19 The light 20 is reflected from the disk through objective lens 11 to routing mirror 13 and to beam splitter 14. All or a portion of the reflected light 12 is reflected from beam splitter 14 through lenses 15 and 16. Lens 15 is a planoconvex lens in the preferred embodiment of the present invention. Lens 16 is a cylindrical lens for introducing an astigmatic effect to light beam 12 and converging light 12 on sensor array 17 at focus spot 18. Because of the astigmatic effect introduced by cylindrical lens 16, the shape of focus spot 18 will indicate the relative focus of objective lens 11. Although not shown, suitable means may be utilized to collimate light 20. For example, a collimating lens may be disposed between a diode laser source and beam splitter 14.

In the preferred embodiment of the present invention, the light source is focused to nearly a diffraction limited spot. The full width, half maximum (FWHM) of the diffraction limited spot is equal to (lambda/2/NA) where lambda is the wave length of the light source and NA is the objective lens numerical aperture. The associated depth of focus is expressed as $\pm$-(lambda/2-/NA/NA). Beyond this range, the size of the light beam increases significantly. Typically, with a 0.8 micron wavelength focused by a 0.5 NA objective lens, the FWHM is 0.8 microns when abberations of the overall optical system is minimized. The depth of focus at such a system is plus or minus 1.6 microns. This is given by way of example only as the present invention has equal application to a plurality of wavelengths, numerical apertures, and depths of focus.

Figures 2A, 2B, 2C:
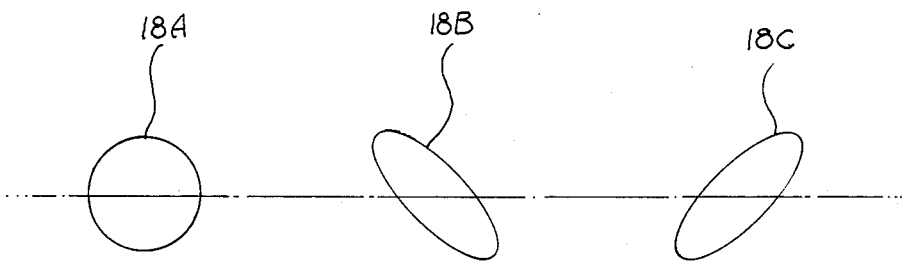
FIGS. 2A–2C illustrates the change in shape and position of the image on the sensor plane after passing through a cylindrical lens.

The shape of focus spot 18 for three positions of objective lens 11 is shown in FIGS. 2A–2C. FIG. 2A illustrates the shape of focus spot 18 when objective lens 11 is positioned such that focal point 19 is "in focus". In this situation focus spot 18 has the shape 18A illustrated in FIG. 2A. When objective lens 11 is too close to optical disk 10, focus spot 18 has the shape 18B illustrated in FIG. 2B, namely, an ellipse. When objective lens 11 is too far away from optical disk 10, focus spot 18 has the shape 18C illustrated in FIG. 2C, namely, an ellipse having a longitudinal axis perpendicular to that of ellipse 18B of FIG. 2B.

As noted previously, variations in track position and displacement of the disk surface in both the radial and axial direction occurs on modern disk media. As a result, objective lens 11 must be repositioned continuously to accurately focus focal point 19 on optical disk 10. By detecting the shape of focus spot 18, a focus error signal may be generated which can then be used to control a servo mechanism to drive objective lens 11 closer to or further away from optical disk 10. Focal point 19 is thereby kept in focus relative to the optical disk 10 as desired.

Figure 7:
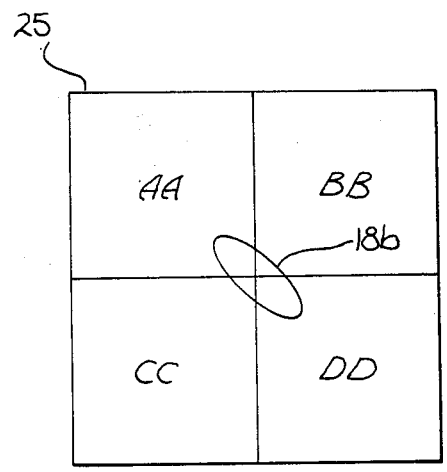
FIG. 7 is a plan view of a prior art sensor array.

One prior art sensor used for generating a focus error signal is illustrated in FIG. 7. This prior art sensor array 25 is comprised of four photosensitive detectors A–D such that one diagonal axis coincides with the longitudinal axis of ellipse 18B of FIG. 2B and the other diagonal axis coincides with the longitudinal axis of ellipse 18C of FIG. 2C. When the objective lens 11 is in focus, focus spot 18 has shape 18A of FIG. 2A and, ideally, the light intensities on all four sensors are equal. When the objective lens 11 is too close to the optical disk 10, ellipse 18B is incident on sensor array 25. By taking the difference of the sums of diagonally disposed sensors, a focus error signal may be generated due to the differences in incident light on the respective sensor pairs (AA, DD) and (BB,CC).

By way of example, ellipse 18B is illustrated in FIG. 7. A focus error signal is generated as follows:

(AA+DD)−(BB+CC)=focus error signal (FES)

In the example shown in FIG. 7, FES is a positive number since the incident light on sensors AA and DD is greater than the incident light on sensors BB and CC. Thus, a positive FES indicates that the objective lens 11 is too close to the optical disk 10. Correspondingly, a negative FES indicates that the objective lens 11 is too far away from optical disk 10. A zero FES would indicate that the objective lens is correctly positioned and that focal point 19 is in focus on the surface of optical disk 10.

Figure 3:
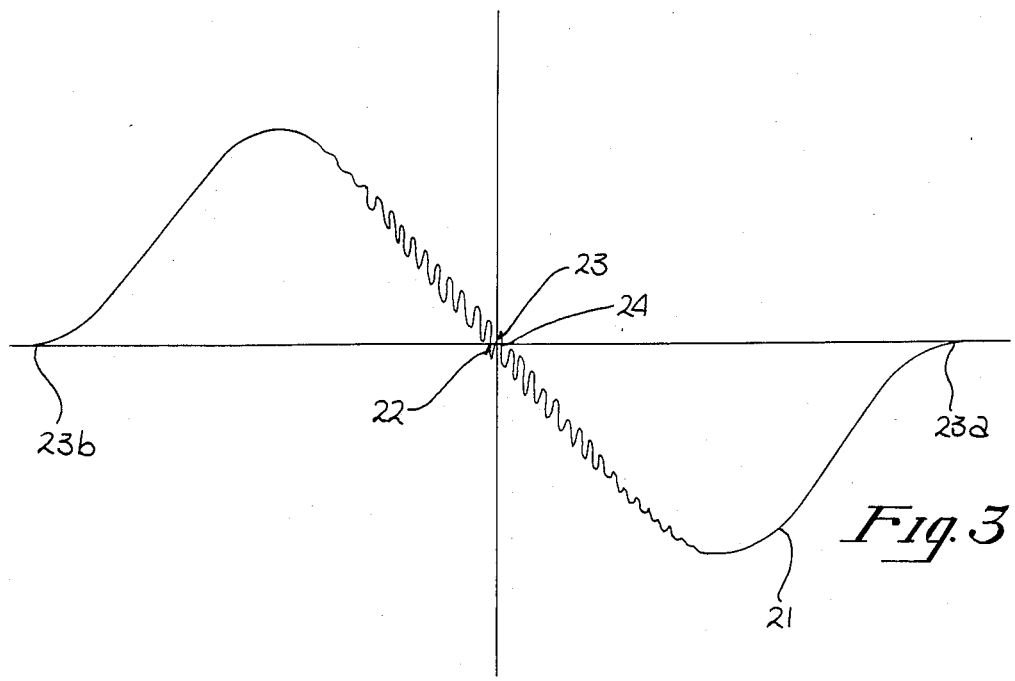
FIG. 3 is a plot illustrating the variation in focus error signal resulting from diffraction patterns.

Referring now to FIG. 3, a plot of the focus error signal with respect to objective lens position is illustrated. Ideally, curve 21 has a single zero crossing at the origin of the imaginary x, y coordinate system of FIG. 3. However, due to aberrations in optical systems, and diffraction patterns that result in nonuniform intensity distribution of light within focus spot 18, a plurality of zero crossings such as 22, 23 and 24 may result. Thus, objective lens 11 may be driven by a focus error signal to a position not in focus yet resulting in a focus spot 18 producing a zero output from sensor array 25.

As focal point 19 of light beam 20 is scanned across tracks 30 of optical disk 10, diffraction patterns are created resulting in +1th, 0th and −1th order diffraction within focus spot 18. In the absence of abberations in the optic system, these diffraction orders will have symmetrical interference fringes relative to sensor 17 and will have less likelihood to create the "multiple-zero crossing" in the focus error signal (FES). However, in the practical environment, disc processing errors and, mechanical mounting errors can create aberrations which will make the interference pattern among different diffraction orders appear and move in an unpredictable manner within the focus spot 18. This causes error in focus accuracy since the focus error signal has multiple zero crossings. Such a system will cause focus error while performing track seeking or data reading, writing or, erasing operations. For example, a false zero reading can occur when the objective lens is not in focus and a false non zero reading can occur when the objective lens is in focus.

Figure 4:
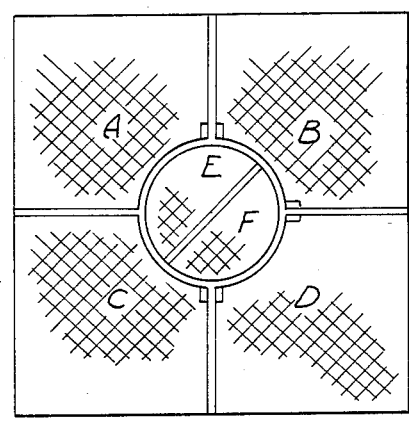
FIG. 4 is a plan view of the preferred embodiment of the sensor array of the present invention.

The preferred embodiment of the present invention is illustrated in FIG. 4 and provides a sensor array which eliminates the problem of focus error due to multiple zero crossings that results from nonuniform intensity distributions of the astigmatic image on sensor array 18. The sensor array 26 consists of a central bi-cell comprising semicircular photosensitive sensors E and F. The sensor array 26 is spatially aligned in such a manner that the sensor E receives the +1th, and half of the 0th order diffraction, and the sensor F receives the −1th and half of the 0th order diffraction.

The central bi-cell is surrounded by four photo sensitive sensors A, B, C, and D in a pattern similar to that of the sensor array of FIG. 7. The size and location of the central bi-cell comprising sensors E and F is chosen so that it is substantially coincident with the in focus spot 18A of focus spot 18. In this manner, sensors A, B, C and D will have nearly zero output when objective lens 11 is in focus.

When there is a very small amount of incident light on sensors A–D, no focus correction steps are performed. In this manner, false non-zero readings that may occur with prior art sensors due to nonuniform intensity distribution are avoided. In the present invention, there is any incident intensity on sensors A, B, C and D focus correction is undertaken. In that situation, if sensors A, B, C, and D are generating a non-zero output, the controlling mechanism assumes focus error and adjusts the objective lens 11 in steps until a positive or negative error signal is reduced to zero and corrects lens position accordingly to obtain a zero output from sensors A, B, C, and D. In the embodiment of FIG. 4, four of the sensors are utilized for focus error correction. However, errors inherent in the prior art sensor array configuration are avoided.

The difference of the sum of light incident on diagonally disposed sensors (e.g. A+D−B+C) is utilized to determine if the focal point is above or below the surface plane of the disk. However, due to the characteristics of focused spot 18 and the sensor array arrangement described in the preferred embodiment of the present invention, generally there is little or no light incident on sensors B and C if there is light incident on sensors A and D and vice versa. Thus, if there is any light incident on sensors A and D, an assumption is made that the objective lens is too close to the disk surface. Likewise, if incident light is detected on either sensors B and C, an assumption is made that the objective lens is too far away from the disk surface.

Although the present invention is discussed in its preferred embodiment with an astigmatic lens system, it will be obvious that any suitable optical element that creates astigmatism of a focus spot in relation to the distance of the objective lens from the disk surface may be employed with the present invention.

In the present invention, the sum of the central bi-cell E and F is utilized for data detection and as a focus enable signal. Tracking information can be derived from the difference of the light incident on sensors E and F respectively. The sum and difference of the light incident on sensors E and F can be used as quadrature signals for track counting.

Figure 6:
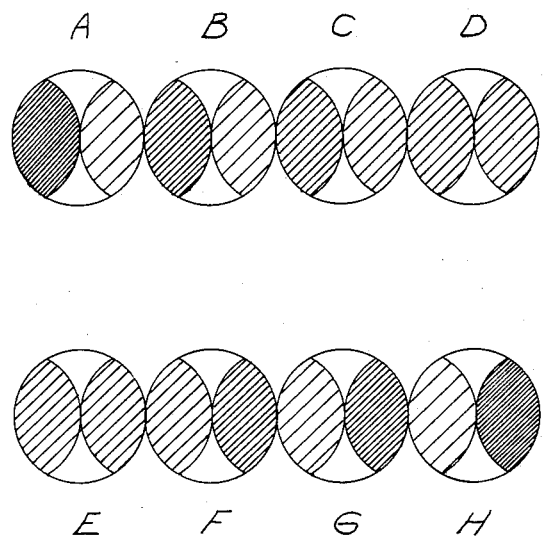
FIG. 6 illustrates the shift in diffraction intensity of a reflected light beam as the focused spot scans across the disk's tracks.

Referring now to FIG. 6, the intensity distribution of incident light in the central bi-cell of the preferred embodiment of the present invention as the focal point 19 moves across track boundaries is illustrated for one example of disk. Phase variations among the different diffraction orders in focused spot 18 as the focal point 19 moves across a track boundary results in a shifting of intensity from left to right as illustrated by the diffraction interference patterns 29A-29D. Focus spot 29 D and E illustrates the intensity of distribution when the focused spot 19 is approximately at the center of a track. At focus spot 29 F and continuing through 29 H the focal point 19 begins to cross over another track boundary. As can be seen from FIG. 6, the distribution is essentially bi-polar so that by taking the difference between the bi-cell elements E and F, the position of the focused spot 19 between track boundaries can also be established.

Referring to FIG. 3, at least 3 zero crossing signals are on the focus error curve, namely points 23, 23a and 23b. When the focused spot is a large distance away from the disk surface, the reflected light is no longer collimated. As a result, the size of the image 18 on sensor array 17 is larger than the size of the sensor array 17. This results the in "zero" 23a and 23b. To inform the focus servo system that the true focus point is at position 23, a focus enable signal is generally required.

The sum of the elements E and F of the inner bi-cell of the sensor array of the present invention can be conveniently utilized as a focus enable signal. The intensity on the bi-cell is greatest when focal point 19 is in focus. By locking the objective lens 11 so that the peak intensity on sensors E and F is maximized, the focused spot 19 is correctly focused.

Figure 5:
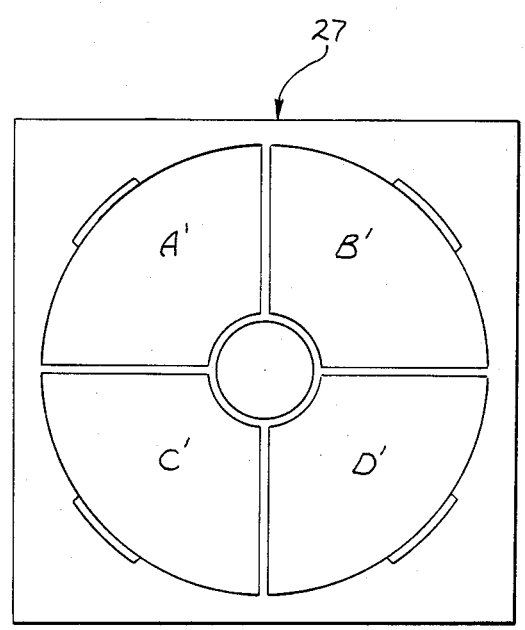
FIG. 5 is a plan view of an alternate embodiment of the sensor array of the present invention.

An alternate embodiment of the sensor array of the present invention is illustrated in FIG. 5. The four outer sensor elements A'-D' are semicircular and surround a central cell which in this embodiment is a single sensor. As with the embodiment of FIG. 4, the four outer sensors are utilized for focus error signal generation. The central cell is used for focus enable. Although the embodiment of FIG. 4 is shown with rectangular outer sensors, the semicircular outer sensors of FIG. 5 may be utilized with that embodiment as well. Although the present invention has been described in connection with a read/write optical disk storage system, it will be obvious that it has equal application to any optical system, including optical compact disks (CD) optical ROM memory (OROM), video disk recorders (VDR), write once read multiple optical disk systems (WROM) as well as with multiple disk embodiments and the like.

Thus, an improved sensor array that may be used in focus position sensing, track position sensing, focus enable sensing, track counting as well as the data detection is described. Although the present invention has been described with respect to its use in optical disk drives, it has equal application whenever it is desired to control the position of an object, such as a lens, with respect to a surface.

I claim:

1. A focal position detecting apparatus comprising:
   a first optical system for providing of a first light beam onto a surface;
   a second optical system disposed in a path of a second light beam reflected from said surface, said second optical system producing a third light beam having a shape dependent on the distance of said first optical system from said surface;
   detection means disposed in a path of said third light beam, said detection means comprising first and second sensing means such that said third light beam is incident on said first sensing means when said first optical system is at a desired distance from said surface and said third beam falls on said first and second sensing means when said first optical system is at a distance from said surface other than said desired distance;
   signal generating means connected to said second sensing means for generating an error signal in response to the amount of light incident on said second sensing means.

2. The apparatus of claim 1 wherein said second sensing means comprises first, second, third and fourth photosensitive sensors disposed symmetrically about said first sensing means.

3. The apparatus of claim 2 wherein said first sensing means comprises a fifth photosensitive sensor.

4. The apparatus of claim 2 wherein said first sensing means comprises fifth and sixth photosensitive sensors.

5. The apparatus of claim 1 wherein said surface comprises an optical disk having information encoded thereon.

6. The apparatus of claim 5 wherein said optical disk rotates with respect to said first beam.

7. The apparatus of claim 1 wherein said second optical system comprises means for introducing astigmatism to said second light beam.

8. The apparatus of claim 7 wherein said means for introducing astigmatism comprises a cylindrical lens.

9. The apparatus of claim 2 wherein said first optical system is at a distance from said surface greater than said desired distance when said third light beam is detected on one of said first and third sensors.

10. The apparatus of claim 2 wherein said first optical system is at a distance from said surface greater than said desired distance when light incident on said first and third sensors is greater than light incident on said second and fourth sensors.

11. The apparatus of claim 2 wherein said first optical system is at a distance from said surface less than said desired distance when said third light beam is detected on one of said second and fourth sensors.

12. The apparatus of claim 2 wherein said first optical system is at a distance from said surface less than said desired distance when light incident on said second and fourth sensors is greater than light incident on said first and third sensors.

13. The apparatus of claim 4 wherein light incident on said fifth and sixth sensors is dependent on a position of said first optical system relative to tracks disposed on said surface.

14. The apparatus of claim 1 wherein light incident on said first sensing means is maximum when said first optical system is at said desired distance.

15. A focal position detecting apparatus comprising:

a first optical system for providing a first light beam on to a surface;

a second optical system disposed in a path of a second light beam reflected from said surface, said second optical system producing an astigmatic light beam having a shape dependent on the distance of said first optical system from said surface;

detection means disposed in a path of said astigmatic light beam, said detection means comprising a central sensing means surrounded by an array of sensing means such that said astigmatic light beam is incident on said array when said first optical system is at a distance from said surface other than a desired distance;

signal generating means connected to said array for generating a focus error signal proportional to the amount of light incident on said array.

16. The apparatus of claim 15 wherein said surface comprises an optical disk having information stored thereon.

17. The apparatus of claim 16 wherein said array of sensing means comprises first, second, third and fourth photosensitive sensors disposed symmetrically about a central sensing means.

18. The apparatus of claim 17 wherein said central sensing means comprises a fifth photosensitive sensor.

19. The apparatus of claim 17 wherein said central sensing means comprises fifth and sixth photosensitive sensors.

20. The apparatus of claim 15 wherein said second optical system comprises a means for introducing astigmatism to said second light beam.

21. The apparatus of claim 20 wherein said means for introducing astigmatism comprises a cylindrical lens.

22. The apparatus of claim 17 wherein said first optical system is at a distance greater from said surface than said desired distance when said astigmatic light beam is detected on one of said first and third sensors.

23. The apparatus of claim 17 wherein said first optical system is at a distance from said surface greater than said desired distance when light incident on said first and third sensors is greater than light incident on said second and fourth sensors.

24. The apparatus of claim 17 wherein said first optical system is at a distance from said surface less than said desired distance when said astigmatic light beam is detected on one of said second and fourth sensors.

25. The apparatus of claim 17 wherein said first optical system is at a distance less than said desired distance when light incident on said second and fourth sensors is greater than light incident on said first and third sensors.

26. The apparatus of claim 19 wherein light incident on said fifth and sixth sensors is dependent on a position of said first optical system relative to tracks on said disk.

27. The apparatus of claim 15 wherein light incident on said first sensing means is at a maximum when said first optical system is at said desired distance.

28. A method for detecting focal position of a light beam with respect to a surface comprising the steps of:

passing said first light beam through a first optical system for illumination of a surface;

reflecting said light beam from said surface and passing said reflected light beam through a second optical system, said second optical system producing a second light beam having a shape dependent on the distance of said first optical system from said surface;

providing a sensor array for detecting said second light beam, said sensor array having a central sensing means and an outer array surrounding said central sensing means;

generating a signal indicating said first optical means is at a desired distance when light is not incident on said outer array;

generating a signal indicating said first optical means is at a distance other than a desired distance when said second light beam is incident on said outer array.

29. The method of claim 28 wherein said second sensing means comprises first, second, third and fourth photosensitive sensors.

30. The method of claim 29 wherein said first sensing means comprises a fifth photosensitive sensor.

31. The method of claim 29 wherein said first sensing means comprises fifth and sixth photosensitive sensors.

32. The method of claim 29 further including the step of generating a differential signal by substracting the sum of light incident on said first and third sensors from the sum of light incident on said second and fourth sensor such that when said differential signal is positive, said first optical system is disposed at a distance greater than said desired distance.

33. The method of claim 31 including the step of detecting the light incident on said fifth and sixth sensors to determine track crossings.

* * * * *